(12) United States Patent
Navarra Pruna

(10) Patent No.: US 10,894,347 B2
(45) Date of Patent: Jan. 19, 2021

(54) DEVICE FOR DEMOLDING PARTS AND MOLD INCLUDING THE DEVICE

(71) Applicant: COMERCIAL DE UTILES Y MOLDES, S.A., Sant Just Desvern (ES)

(72) Inventor: Alberto Navarra Pruna, Sant Just Desvern (ES)

(73) Assignee: COMERCIAL DE UTILES Y MOLDES, S.A., SANT JUST DESVERN (ES)

( * ) Notice: Subject to any disclaimer, the term of this patent is extended or adjusted under 35 U.S.C. 154(b) by 545 days.

(21) Appl. No.: 15/409,346

(22) Filed: Jan. 18, 2017

(65) Prior Publication Data

US 2017/0203481 A1 Jul. 20, 2017

(30) Foreign Application Priority Data

Jan. 18, 2016 (ES) .................... 201630048

(51) Int. Cl.
| | |
|---|---|
| *B29C 45/40* | (2006.01) |
| *B29C 45/44* | (2006.01) |
| *B29C 45/33* | (2006.01) |
| *B29C 33/46* | (2006.01) |
| *B29K 101/12* | (2006.01) |

(52) U.S. Cl.
CPC ............ *B29C 45/401* (2013.01); *B29C 33/46* (2013.01); *B29C 45/332* (2013.01); *B29C 45/44* (2013.01); *B29C 2045/4026* (2013.01); *B29K 2101/12* (2013.01)

(58) Field of Classification Search
CPC ..... B29C 45/401; B29C 33/46; B29C 45/332; B29C 45/44; B29C 2045/4026; B29C 33/442; B29K 2101/12
USPC ........................................................ 425/556
See application file for complete search history.

(56) References Cited

U.S. PATENT DOCUMENTS

| | | | |
|---|---|---|---|
| 4,805,803 A * | 2/1989 | Pontius ................. | B29B 7/7673 222/52 |
| 4,854,849 A * | 8/1989 | Sudo ................... | B29C 45/4435 425/556 |

(Continued)

FOREIGN PATENT DOCUMENTS

| | | |
|---|---|---|
| CN | 204322365 U | 5/2015 |
| CN | 204749039 U | 11/2015 |

(Continued)

OTHER PUBLICATIONS

Search Report dated Apr. 27, 2016 for corresponding ES Application No. 201630048.

*Primary Examiner* — Robert C Dye
*Assistant Examiner* — Guy F Mongelli
(74) *Attorney, Agent, or Firm* — Knobbe, Martens, Olson & Bear, LLP

(57) ABSTRACT

A device for demolding parts includes a slider for housing a figure insert for the molding of a negative of the part to be molded. The slider is associated with a push rod, which can move the slider to an ejection position of a part to be molded. The device also includes a gas cylinder for driving the displacement of the push rod. The device eliminates an inclined guide and a safety wedge, saving a great deal of work and focusing all the machining only on a punch plate.

10 Claims, 3 Drawing Sheets

(56) References Cited

U.S. PATENT DOCUMENTS

| | | | | |
|---|---|---|---|---|
| 4,899,912 | A * | 2/1990 | Pontius | B29B 7/7684 222/145.2 |
| 5,219,594 | A * | 6/1993 | Meyer | B29C 45/4435 249/180 |
| 5,451,156 | A * | 9/1995 | Roncelli | B29C 45/2673 249/67 |
| 5,531,588 | A * | 7/1996 | Brun, Jr. | B29C 45/332 425/556 |
| 5,556,651 | A * | 9/1996 | Watanabe | B29C 45/40 425/556 |
| 6,042,360 | A * | 3/2000 | Padovani | B29C 57/12 425/403.1 |
| 10,549,459 | B2 * | 2/2020 | Belliard | B29C 45/401 |
| 2006/0113709 | A1 * | 6/2006 | Hirano | B29C 45/401 264/328.1 |
| 2006/0115551 | A1 * | 6/2006 | Peukert | B29C 33/02 425/468 |
| 2011/0100581 | A1 * | 5/2011 | Kishikawa | B22D 17/007 164/137 |
| 2011/0127761 | A1 * | 6/2011 | Yoshizawa | B60K 15/03177 280/834 |
| 2011/0193266 | A1 * | 8/2011 | Fukuta | B29C 45/34 264/328.1 |
| 2013/0071512 | A1 * | 3/2013 | Antonana Gastesi | B29C 45/2614 425/556 |
| 2014/0183005 | A1 * | 7/2014 | Meyer | B29C 43/245 198/782 |
| 2017/0284521 | A1 * | 10/2017 | Sorimoto | B29C 45/44 |

FOREIGN PATENT DOCUMENTS

| | | |
|---|---|---|
| ES | 2398793 A1 | 3/2013 |
| ES | 2542024 A1 | 7/2015 |
| JP | 2010-099932 A | 5/2010 |

* cited by examiner

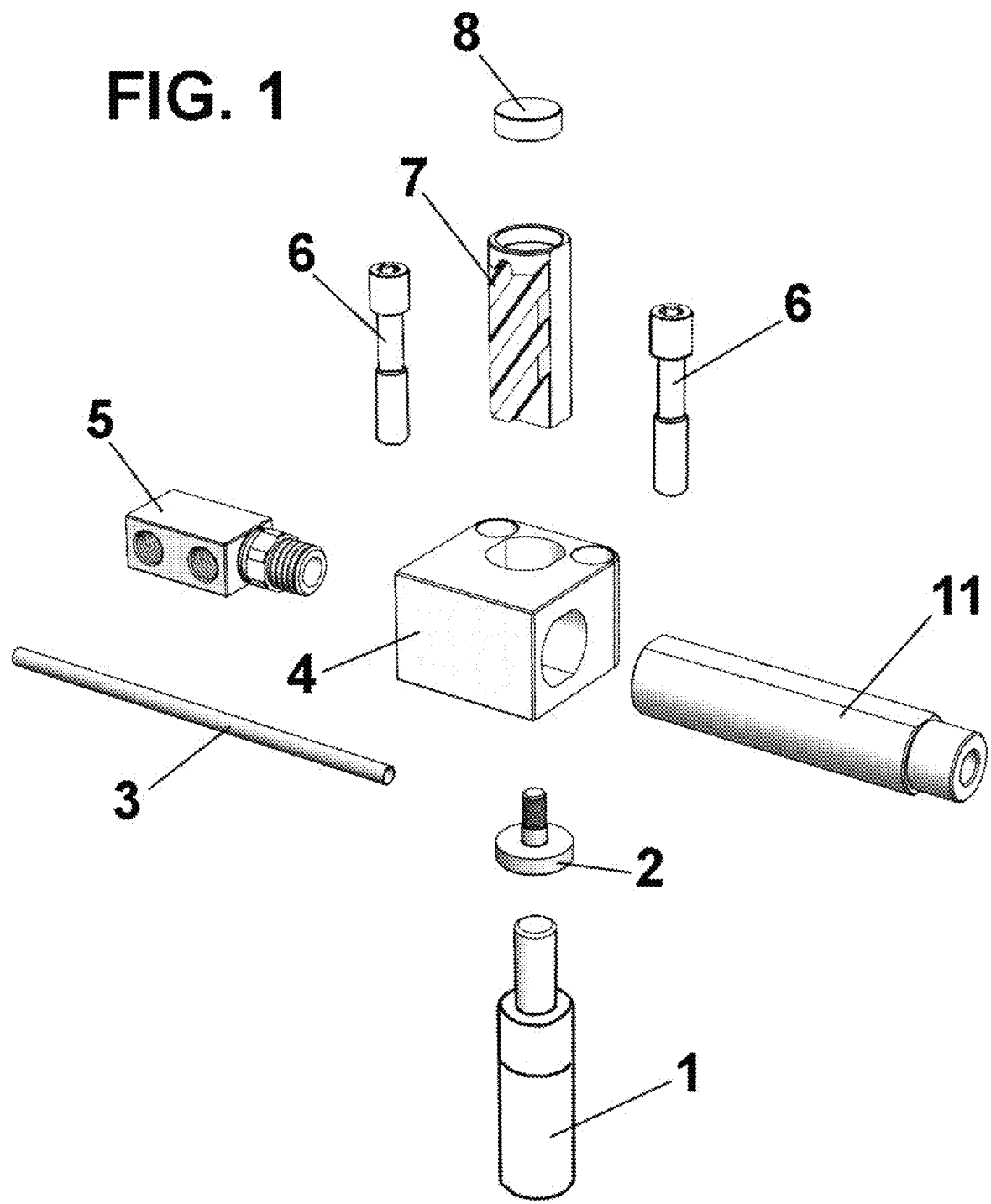

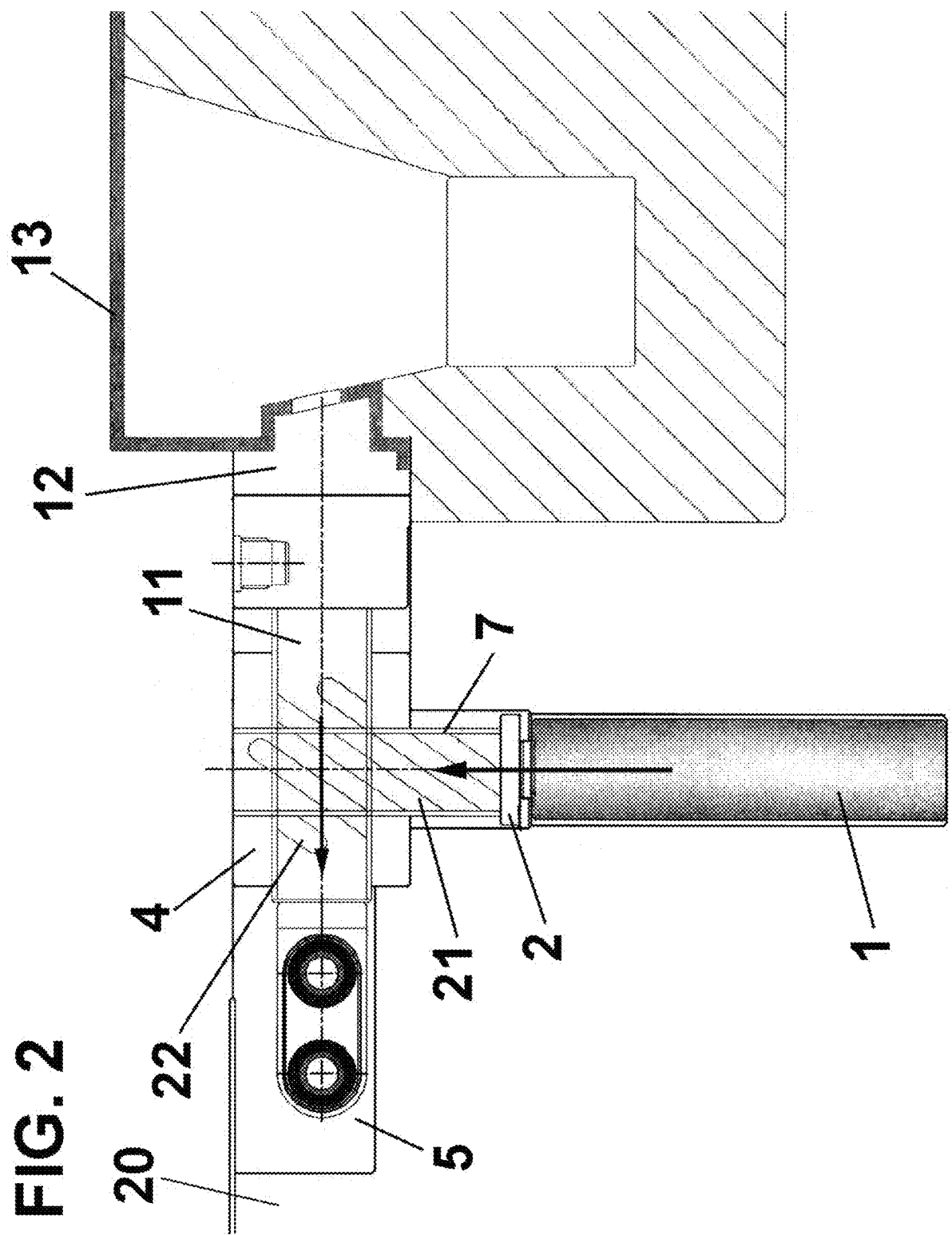

DEVICE FOR DEMOLDING PARTS AND MOLD INCLUDING THE DEVICE

FIELD

Certain aspects of the present disclosure relate to a device for demolding negative area parts in thermoplastic injection molds and to a mold comprising said device.

BACKGROUND

An injection machine and a mold are required in order to manufacture a plastic part by means of the injection method.

The injection machine must in each case have the appropriate characteristics with respect to the capacity of the mold to be injected.

SUMMARY OF CERTAIN EMBODIMENTS

The mold itself consists of a steel structure formed by a minimum of two plates that are capable of being separated. In one of these plates the cavity of the part to be reproduced, called the cavity plate, is machined, while in the other the punch to carry out the emptying of the product itself is machined. This plate is called a punch plate, since the purpose is to make a volumetric product with the minimum thickness required.

These plates incorporate guides in one of them, and bushes in the other, so that they can be joined or separated in order to open or close the mold, maintaining in all cases the same position of one with respect to the other. This mold also incorporates cooling circuits through which a coolant circulates in order to accelerate the cooling and solidification of the injected part. Also, in order to be able to demold the product, this mold must incorporate an ejection system that, through properly distributed ejectors, makes it possible to push the part once cooled to remove it from the punch. Due to the contraction of the material itself, when passing through the liquid state upon the injection of the product (hot plastic material) to the solid state (cooled material), the part always remains adhered to the punch.

The machining both in the cavity and the punch ensure that, with the mold closed, the two plates remain in contact while leaving a cavity in the entire machined area capable of being filled with molten plastic and, once cooled, of faithfully reproducing the shape of this cavity.

Once the plastic part has cooled, it acquires the rigidity of the selected material, and it is from this moment that the part can be removed from the mold, or in other words, that the injected product can be demolded.

In all cases, the shape of the part indicates the way in which the molds need to be manufactured. It is generally important to ensure that the direction of demolding of the injected parts can take place without any interference. The demolding process is carried out in all cases in the opening direction of the mold plates.

There are many parts that, due to their physical structure, cannot be demolded without exhibiting certain disadvantages. In these cases it is necessary to incorporate a certain mechanism in the mold that makes it possible to partially demold the parts of the product in a different direction than in the traditional system. However, in all cases, it is required that these partial demolding be performed prior to the total demolding of the product.

These mechanisms, called sliders, are basically mechanical, although hydraulic, pneumatic, or electrical systems may be used in certain circumstances, all of them having the additional difficulties of requiring certain external operating controls to carry out the sequence of the process.

These mechanical drive mechanisms are mostly used because of their ease of operation and are formed by two groups of components: the group on the punch plate comprises a slider, a friction base, two lateral sliding guides and a safety positioner that maintains the slider in the same position from the opening of the mold to the closing of the same.

The group of elements of the cavity plate is comprised of an inclined guide and its respective housing. For the two groups of components to work perfectly, precision is required to ensure the perfect operation of the mold.

The slider is the moving part of this assembly and slides through the described guides and the sliding base during the opening and closing of the mold. When pushed by the inclined guide of the cavity plate, it stops and remains in the same position until the mold is closed thanks to the safety positioner.

This slider must be properly sized with controlled thermal treatments and suitable fitting tolerances to avoid any type of burr due to lack of adjustment. This slider must be machined with the corresponding figure part on its frontal face (in many cases, the frontal figure is machined on a figure insert fitted in the slider itself).

All the adjustment operations between the two figure plates and the sliders themselves must be carried out in the final adjustment phase of the mold; this is delicate work and requires highly qualified personnel, and in many cases it requires machines called adjustment presses for the execution of this operation, which involves opening and closing during the entire adjustment operation of the entire mold.

Therefore, an object of some embodiments of the present invention is to provide a device for the demolding of parts that makes it possible to eliminate the inclined guide and the safety wedge, saving a great deal of work and focusing all the machining only on the punch plate. In consequence, these embodiments do not require any object inside the mold cavity, with the resulting savings in adjustments and maintenance that this implies.

DESCRIPTION OF EMBODIMENTS OF THE INVENTION

With the demolding device of certain embodiments of the present invention it is possible to minimize the number of components, as well as their ease of installation and machining costs, since the entire mechanism in question is housed only in one of the mold plates, and specifically in the so-called punch plate. It does not require any kind of machining in the cavity plate of the molds, thereby fully eliminating the final adjustment phase.

In the present description and the attached claims, the following terms are interpreted as follows:

"Slider", is a hardened and ground shaft that comprises an angular rack-shaped gear.

"Push rod", is a hardened and ground shaft with an angular rack-shaped gear.

"Fixing base" is a cubic block made of tempered steel, with bores preferably interlaced in perpendicular form capable of being machined at predetermined angles for specific cases. At the part where the slider and the push rod slide, it incorporates housings for the affixing thereof to the punch plate.

As a motor accessory, a gas cylinder known as a "gas spring" is incorporated independently.

This demolding device comprises a fixing base, incorporating a slider and a push rod; both toothed and interlocked with one another through properly sized holes and a gas cylinder. The shaft of the gas cylinder is expanded in all cases.

At the bottom of the fixing base, the gas cylinder is housed by means of a properly sized hole with a gap ranging between 0.1 and 0.5 mm in order for the fixing base not to withstand any pressure from the cylinder.

Given that the gas cylinder has an expanded shaft, the fixing base will be with in a resting position with the push rod and therefore the slider will remain in its open position, while upon closing the mold, the cavity plate pushes the push rod, and is in turn pushed through the cylinder shaft by compressing the gas and exerting a constant opening force, which in all cases will be overcome by the closing force of the machine. When the machine is fully closed, the mold is completely closed as well and therefore the injection of the part can be carried out. Once the part is cooled, the mold is opened and the gas cylinder returns to its normal state due to the pressure of the compressed gas resulting in, through the push rod, the sliding of the slider in the direction of demolding.

From this moment on, the mold will have all negatives open and can therefore proceed with the ejection of the part.

When the mold is once again closed, the whole cycle is repeated and so on and so forth to complete the sequence automatically.

The slider is intended to be used with or without a cooling circuit. For this purpose, the sliding shaft is provided with machining coupling for the figure insert and with a built-in sealing gasket since, given its basic structure, the slider in all cases is a simple bar made of steel of different diameters with the corresponding machining to be able to perform the specific function for which it has been designed. With this particularity, the possibility of coupling infinite combinations of figures has practically no limits. If a cooling circuit is indeed incorporated, the system will have a rotating cooling source, which can be coupled to all models with the particularity that a single standard thread allows for an infinite number of connections.

In order to provide a greater ease of adjustment, the push rod incorporates a fine adjustment disc, which provides a precise finish at all times, even without removing the mold from the machine.

The entire cooling system, any change of figure inserts, maintenance functions, change of components or any repair that could be required during the production phase, as well as any sort of manipulation at the slider, can be conducted in a short period of time, since for this purpose the mold does not have to be disassembled from the machine, as it happens in many other occasions.

The device for demolding parts of an embodiment of the present invention is defined in accordance with the independent claim. Additional optional features of the device for demolding parts of this and other embodiments of the invention are defined in the dependent claims.

According to a second aspect, embodiments of the present invention relate to a mold comprising the above-mentioned device for demolding parts, wherein said device is arranged in one of the mold plates, and in particular in the punch plate.

BRIEF DESCRIPTION OF THE DRAWINGS

For a better understanding of the foregoing, a set of drawings have been attached which, schematically and as a non-limitative example, represent a practical embodiment of the invention.

FIG. 1 is an exploded perspective view of the device for demolding parts according to the practical embodiment of the invention;

FIG. 2 is a schematic elevational view of the device for demolding parts of the practical embodiment of the invention.

DESCRIPTION OF A PREFERRED EMBODIMENT

Figure 3C:
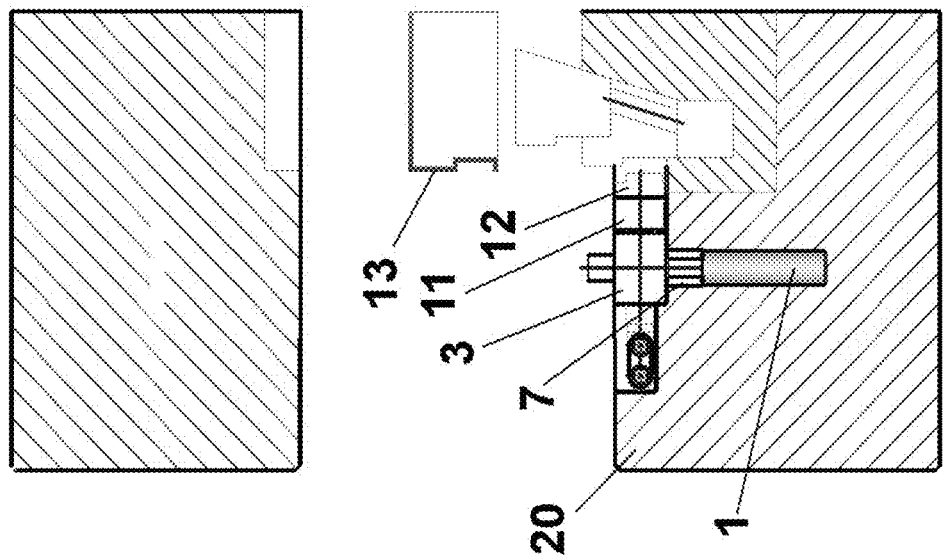
FIGS. 3a to 3c are schematic elevational views of a mold provided with the device for demolding parts of the practical embodiment of the invention in its injection position with the mold closed, in the open position of the mold and in the ejection position, respectively.
Figure 3B:
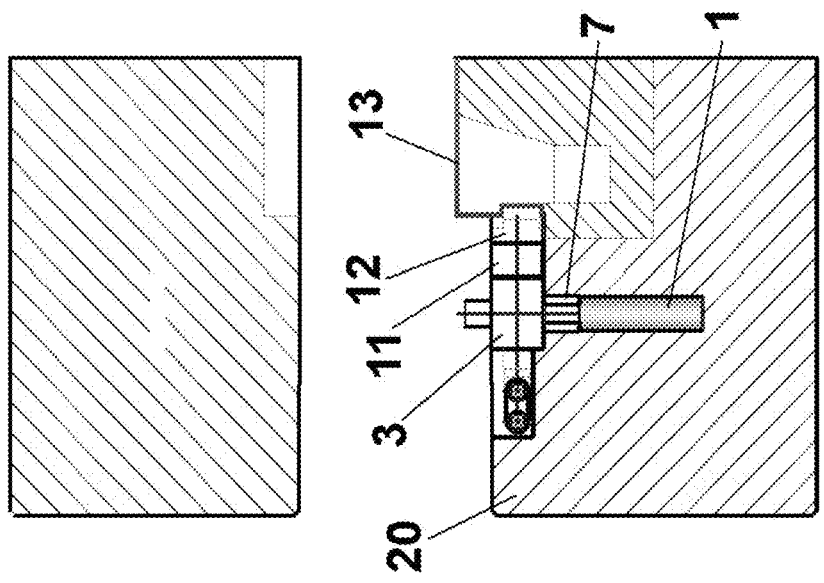
Figure 3A:
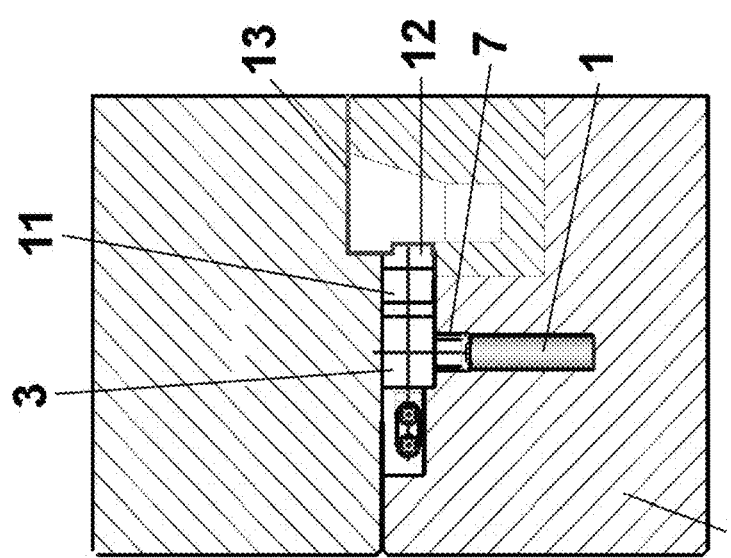

Said device for demolding parts of the present embodiment is arranged in its entirety on a plate 20 of the mold, and in particular in the so-called punch plate, as can be seen in particular in FIGS. 3a to 3c, and comprises in its upper part a base 4 on which a slider 11 slides. Said base 4 is attached to the mold by means of fixing screws 6.

Said device also comprises a figure insert 12 (shown in FIG. 2) removably attached to said slider 11, the insert 12 of which molds a negative 13 or protrusion in the desired shape. Evidently, said insert 12 can be removed and a different insert be inserted to carry out the molding of a part with a different inner protrusion. Said insert 12 is the element in which the shape of the negative to be reproduced in the plastic part is machined.

The device of the present embodiment also comprises a push rod 7 located substantially vertically in the mold. Said push rod 7 moves said insert 12 between a closed position (shown in FIG. 3a), an open position (shown in FIG. 3b) and an ejection position (shown in FIG. 3c) of the mold.

The movement of the push rod 7 is actuated by a gas cylinder 1, which piston rod can be positioned only in an extended position or in a retracted position.

When the piston rod of the gas cylinder 1 is in the retracted position, the slider 11 is in the molding position of the plastic part 13 (FIGS. 2 and 3a), while when the gas cylinder 1 is in the extended position, the slider 11 is in the release position of the plastic part (FIG. 3b). When the gas cylinder 1 goes from its retracted position to its extended position, the slider retracts or slides to the left, according to the arrangement shown in FIG. 2.

The distal end of the piston rod preferably enters into contact with the push rod 7 by means of a stop 2, secured to one of the ends of the push rod 7.

At the other end, said push rod 7 preferably comprises a adjustment disk 8, for easily and accurately adjusting the length of the push rod 7.

Said push rod 7 comprises at its upper end a rack 21, which engages with another rack 22 of said slider 11, the movement of said push rod 7 being transferred to said slider 11 through said racks 21, 22.

As it can be seen in the figures, the rack 22 of the slider 11 is positioned with its teeth inclined towards the longitudinal axis of the slider 11, and the teeth of the drive rack 21 of the push rod 7 are also inclined with respect to the longitudinal axis of the push rod 7.

It should be noted that the inclination of these teeth is variable, such that it is possible to vary the inclination of the slider 11 with respect to the push rod 7 in a very simple manner, thereby increasing or decreasing the demolding path.

If desired, the demolding device according to the present embodiment may also comprise cooling, and in particular a cooling source 5 provided with a tube 3 for the passage of cooling water, thereby cooling the insert 12 and/or the gas cylinder 1 and, consequently, the negative 13. This cooling source 5 is rotatable, which allows the positioning of said cooling source 5.

Although reference has been made to a particular embodiment of the invention, it will be evident to a person skilled in the art that the demolding device and the mold described herein are susceptible to numerous variations and modifications, and that all of the above details can be replaced by other technically equivalent details without departing from the scope of protection defined by the attached claims.

What is claimed is:

1. A device for demolding parts in a mold, comprising:
   a slider for housing a figure insert for molding a negative of a part to be molded,
   a push rod slidably arranged in a direction perpendicular to a longitudinal axis of the slider and configured to move said slider to an ejection position of the part to be molded, and
   a gas cylinder for driving the displacement of said push rod,
   wherein said push rod comprises an adjustment disk at an end opposite to the gas cylinder for adjusting the length of the push rod.

2. The device for demolding parts in a mold according to claim 1, wherein the gas cylinder comprises a piston rod which can only be placed in an extended position or in a retracted position.

3. The device for demolding parts in a mold according to claim 1, wherein said push rod comprises a rack, which engages with another rack of said slider, the movement of said push rod being transferred to said slider through said racks.

4. The device for demolding parts in a mold according to claim 1, comprising a base on which said slider slides.

5. The device for demolding parts in a mold according to claim 3, wherein said rack of the slider is positioned with its teeth inclined to the longitudinal axis of the slider.

6. The device for demolding parts in a mold according to claim 3, wherein teeth of said rack of the push rod are positioned inclined with respect to a longitudinal axis of the push rod.

7. The device for demolding parts in a mold according to claim 1, comprising a cooling source of said insert.

8. The device for demolding parts in a mold according to claim 7, wherein said cooling source comprises a tube for a passage of cooling water to said insert.

9. A mold comprising the device for demolding parts according to claim 1, wherein said device is arranged entirely on a plate of the mold.

10. The mold according to claim 9, wherein said plate on which the device for demolding parts is placed is a punch plate of the mold.

* * * * *